United States Patent
Mizumoto et al.

(10) Patent No.: US 10,429,813 B2
(45) Date of Patent: Oct. 1, 2019

(54) COMMUNICATION SYSTEM, COMMUNICATION DEVICE, AND COMMUNICATION PROGRAM

(71) Applicant: OMRON Corporation, Kyoto-shi, Kyoto (JP)

(72) Inventors: Hirohito Mizumoto, Otsu (JP); Kenji Sato, Kusatsu (JP); Ziqiang Xu, Kusatsu (JP); Hajime Ujiie, Takatsuki (JP); Atsushi Kamimura, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 95 days.

(21) Appl. No.: 15/784,238

(22) Filed: Oct. 16, 2017

(65) Prior Publication Data

US 2018/0157233 A1 Jun. 7, 2018

(30) Foreign Application Priority Data

Dec. 5, 2016 (JP) ................................. 2016-235812

(51) Int. Cl.
G05B 19/05 (2006.01)
G05B 19/042 (2006.01)
(Continued)

(52) U.S. Cl.
CPC ....... G05B 19/052 (2013.01); G05B 19/0421 (2013.01); G05B 19/054 (2013.01);
(Continued)

(58) Field of Classification Search
CPC .... G05B 19/05; G05B 19/052; G05B 19/056; G05B 19/058; G05B 2219/1113;
(Continued)

(56) References Cited

U.S. PATENT DOCUMENTS

2004/0090925 A1* 5/2004 Schoeberl ......... H04L 12/40078
370/254
2012/0224580 A1 9/2012 Büttner et al.
(Continued)

FOREIGN PATENT DOCUMENTS

| EP | 2688250 A1 | 1/2014 |
| EP | 2484058 B1 | 12/2014 |
| JP | 2012-194631 A | 10/2012 |

OTHER PUBLICATIONS

Extended European search report dated May 16, 2018 in a counterpart European patent application.

*Primary Examiner* — Laura N Nguyen
(74) *Attorney, Agent, or Firm* — Metrolex IP Law Group, PLLC (57) ABSTRACT

A communication system includes a communication device functioning as a master device and a plurality of slave devices communicably connected to the communication device via a communication line, the communication device setting a prescribed address in an added slave device based on a position of the added slave device in a topology composed of a plurality of slave devices, judging whether a change has possibly occurred in the topology when the prescribed address is set in the added slave device, if there is an erroneously set slave device whose address was erroneously set, specifying that slave device, when it is judged that a change has possibly occurred, and resetting the address of the specified erroneously set slave device to an original address.

7 Claims, 3 Drawing Sheets

(51) Int. Cl.
*G05B 19/418* (2006.01)
*H04L 12/24* (2006.01)
*H04L 12/751* (2013.01)
*H04L 12/40* (2006.01)
*H04L 29/12* (2006.01)

(52) U.S. Cl.
CPC ....... *G05B 19/058* (2013.01); *G05B 19/4185* (2013.01); *H04L 12/40019* (2013.01); *H04L 41/12* (2013.01); *H04L 45/02* (2013.01); *G05B 19/0423* (2013.01); *G05B 2219/1113* (2013.01); *G05B 2219/1115* (2013.01); *G05B 2219/1116* (2013.01); *G05B 2219/21028* (2013.01); *G05B 2219/21048* (2013.01); *G05B 2219/2231* (2013.01); *G05B 2219/25428* (2013.01); *G05B 2219/33143* (2013.01); *H04L 61/2038* (2013.01)

(58) Field of Classification Search
CPC .... G05B 2219/1115; G05B 2219/1116; G05B 2219/21028; G05B 2219/21048; H04L 12/28; H04L 45/02
See application file for complete search history.

(56) References Cited

U.S. PATENT DOCUMENTS

| | | | |
|---|---|---|---|
| 2014/0082116 A1 | 3/2014 | Sasaki et al. | |
| 2014/0122631 A1* | 5/2014 | Tahara | H04L 41/04 709/208 |
| 2016/0105320 A1* | 4/2016 | Osterberg | H04L 41/0853 709/208 |

* cited by examiner

COMMUNICATION SYSTEM, COMMUNICATION DEVICE, AND COMMUNICATION PROGRAM

CROSS-REFERENCES TO RELATED APPLICATIONS

This application claims priority to Japanese Patent Application No. 2016-235812 filed Dec. 5, 2016, the entire contents of which are incorporated herein by reference.

FIELD

This disclosure relates to a communication system, a communication device and a communication program, and more particularly to a communication system, a communication device and a communication program in a control system that is used in order to control the operations of machinery, equipment and the like.

BACKGROUND

Machinery and equipment that are used at many production sites are, typically, controlled by a control system that is constituted by a programmable logic controller (hereinafter, also referred to as "PLC") or the like. Such a control system collects field information from external switches, sensors and the like, and outputs instruction values obtained by computations that are based on the collected information, in order to perform predetermined control on machinery and equipment.

Such collection of field information and output of instruction values are often performed via a network. For example, JP 2012-194631A discloses a network system formed by at least one or more master devices and a plurality of slave devices being connected via a network.

JP 2012-194631A is an example of background art.

There are systems that are configured such that, in the case of newly adding a slave device to the topology of a network such as described above, the setting value of a node address is automatically written to the added slave device, based on the position of the slave device in the topology. In such systems, when processing in which the setting value of the node address is written is performed, there are cases where the setting value of the node address is written to an unintended slave device when a change occurs in the topology. In such cases, the setting value of the node address of a slave device that was operating normally till then will be rewritten, thus causing problems such as an anomaly in the network or a malfunction of the slave device caused by the setting value of the wrong node address.

Also, in the case where such an anomaly or malfunction occurs, it takes time to restore the system, since tasks such as specifying and resetting the slave device that was mistakenly rewritten are necessary, even when it is known that the setting value of the node address was mistakenly rewritten.

One or more aspects have been made in order to solve the abovementioned problems, and an object thereof is to provide a communication system, a communication device and a communication program that enable an address of a slave device to be efficiently configured to a correct state.

SUMMARY

According to one aspect, a communication system includes a communication device functioning as a master device and a plurality of slave devices communicably connected to the communication device via a communication line. The communication device includes a setting unit, a judging unit, a specifying unit, and a resetting unit. The setting unit sets a prescribed address in an added slave device based on a position of the added slave device in a topology that is composed of a plurality of the slave devices. The judging unit judges whether a change has possibly occurred in the topology when the prescribed address is set in the added slave device by the setting unit. The specifying unit, if there is an erroneously set slave device whose address was erroneously set by the setting unit, specifies the erroneously set slave device, when it is judged by the judging unit that a change has possibly occurred. The resetting unit resets the address of the erroneously set slave device specified by the specifying unit to an original address.

According to another aspect, a communication device functions as a master device that is communicably connected to a plurality of slave devices via a communication line, and includes a setting unit, a judging unit, a specifying unit, and a resetting unit. The setting unit sets a prescribed address in an added slave device based on a position of the added slave device in a topology that is composed of a plurality of the slave devices. The judging unit judges whether a change has possibly occurred in the topology when the prescribed address is set in the added slave device by the setting unit. The specifying unit, if there is an erroneously set slave device whose address was erroneously set by the setting unit, specifies the erroneously set slave device, when it is judged by the judging unit that a change has possibly occurred. The resetting unit resets the address of the erroneously set slave device specified by the specifying unit to an original address.

It may be preferable that the setting unit includes a setting storage unit that stores in advance setting information indicating positions of the plurality of slave devices that are included in the topology, a position specifying unit that specifies the position of the added slave device based on the setting information stored in the setting storage unit, and a transmitting unit that transmits a command for setting the prescribed address to the slave device that is at the position specified by the position specifying unit.

It may be preferable that the specifying unit includes an acquiring unit that acquires unique information from the set slave device whose address was set by the setting unit, and an address judging unit that judges whether an address corresponding to the unique information acquired by the acquiring unit differs from the prescribed address, and in a case where it is judged by the address judging unit that the address differs, specifies the set slave device as the erroneously set slave device.

It may be preferable that the judging unit judges whether a change has possibly occurred in the topology by detecting that the communication line has been disconnected/connected in a slave device.

It may be preferable that the judging unit judges whether a change has possibly occurred in the topology by detecting whether the number of slave devices had changed.

According to another aspect, a communication program is executed in a communication device functioning as a master device that is communicably connected to a plurality of slave devices via a communication line, the communication program causing execution of a step of setting a prescribed address in an added slave device based on a position of the added slave device in a topology that is composed of a plurality of the slave devices, a step of judging whether a change has possibly occurred in the topology when the prescribed address is set in the added slave device, a step of, if there is an erroneously set slave device whose address was erroneously set, specifying the erroneously set slave device, when it is judged that a change has possibly occurred in the topology, and a step of resetting the address of the specified erroneously set slave device to an original address.

According to one or more aspects, it is possible to provide a communication system, a communication device and a communication program that enable an address of a slave device to be efficiently configured to a correct state.

DETAILED DESCRIPTION

Embodiments will be described in detail, with reference to the drawings. Note that the same reference signs are given to parts that are the same or equivalent in the drawings, and description thereof will not be repeated.

In one or more embodiments, a system centered around a PLC is illustrated as an example of a control system. As such a control system, however, a configuration that is centered around not only a PLC but various types of industrial computer can also be employed. Furthermore, in the case where new processing devices (computational devices) are developed as a result of advances in technology, such new processing devices can also be employed.

A. Overall Configuration of PLC System

Figure 1:
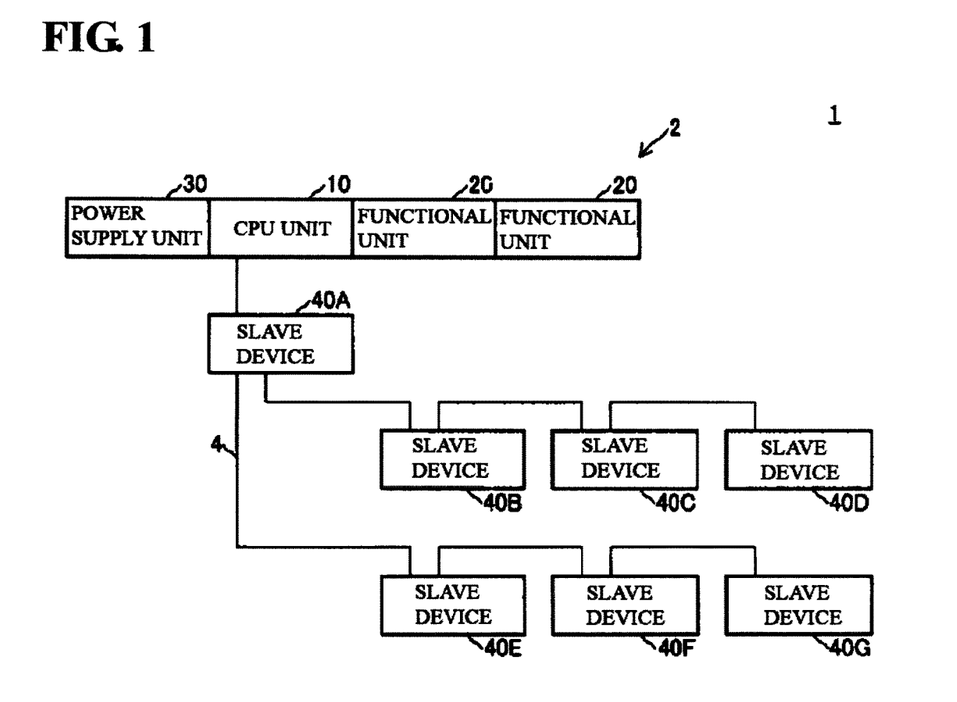
FIG. 1 is a schematic diagram illustrating the overall configuration of a PLC system according to one or more embodiments.

First, the overall configuration of a PLC system 1 according to one or more embodiments, which is one mode of the control system, will be described. FIG. 1 is a schematic diagram showing the overall configuration of the PLC system 1 according to one or more embodiments.

Referring to FIG. 1, the PLC system 1 is a control system for controlling a control target, and includes a master device 2 and one or more slave devices 40A to 40G (hereinafter, may also be referred to generally as "slave devices 40"). The master device 2 and the slave devices 40 are control devices constituting at least part of the PLC system 1, and are connected via a field network 4.

Communication via the field network 4 is actively controlled by the master device 2. Specifically, the master device 2 sends data that is sequentially transmitted over the field network 4, in accordance with a predetermined timing or rule. In the following description, data that is sequentially transmitted over the field network 4 will also be referred to as "communication frames". In this sense, the master device 2 is referred to as a "master device" and each of the slave devices 40A to 40G are also referred to as a "slave device."

The master device 2, by executing programs (including user programs and system programs, as will be discussed later) required in order to control the control target, realizes processing for collecting input signals (hereinafter, also referred to as "field information") from external switches, sensors and the like and performing control computations based on the collected field information, processing for giving instruction signals calculated by control computations to external relays, actuators and the like.

The master device 2 includes, as the device configuration thereof, a CPU unit 10, one or more functional units 20, and a power supply unit 30. The CPU unit 10 and the functional units 20 are connected so as to be able to perform data communication with each other via an internal bus which is not illustrated. The power supply unit 30 supplies power of an appropriate voltage to the CPU unit 10 and the functional units 20. The functional units 20 include an IO unit and a special unit.

The IO unit is a unit relating to general input/output processing, and administers input and output of binarized data, namely, ON/OFF. That is, the IO unit collects information indicating one of a state (ON) where an object of some sort has been detected by a sensor such as a detection switch and a state (OFF) where an object of some sort has not been detected. Also, the IO unit outputs one of an instruction (ON) for activation and an instruction (OFF) for deactivation to an output destination, namely, a relay or an actuator.

The special unit has functions that are not supported by the IO unit, namely, input/output of analog data, temperature control, and communication using a specific communication method.

The CPU unit 10 includes a computational part that executes programs required in order to control the control target, and a communication controller 110 that corresponds to a communication processing part for controlling communication with the slave devices 40 via the field network 4.

The slave devices 40 receive field information that is from external switches and sensors, and transmit communication frames (IN data) that depend on the received field information to the master device 2, via the field network 4. Additionally, the slave devices 40 output instruction signals that depends on communication frames (OUT data) received from the master device 2 via the field network 4 to external relays and actuators. Alternatively, the slave devices 40 may operate independently in accordance with instruction values that depend on OUT data received via the field network 4. For example, as the slave devices 40, devices that include simple functional units without a computational function, functional units with a computational function, and actuators such as a motion controller are envisaged. Here, the slave device 40A is a branch slave device that functions as a hub.

The communication controller 110 of the CPU unit 10 is configured to manage cyclic transmission over the field network 4 of data strings (in one or more embodiments, also referred to as "communication frames") including data that is handled by the master device 2 and one or more slave devices 40. Note that, in FIG. 1, a so-called daisy chain network is schematically shown, but the network may be a network employing a ring format. In other words, any configuration that is able to transmit data strings (communication frames) cyclically may be employed, as the network according to one or more embodiments. Typically, communication processing according to one or more embodiments can also be applied to a network employing a total frame system.

B. Device Configuration of CPU Unit 10

Figure 2:
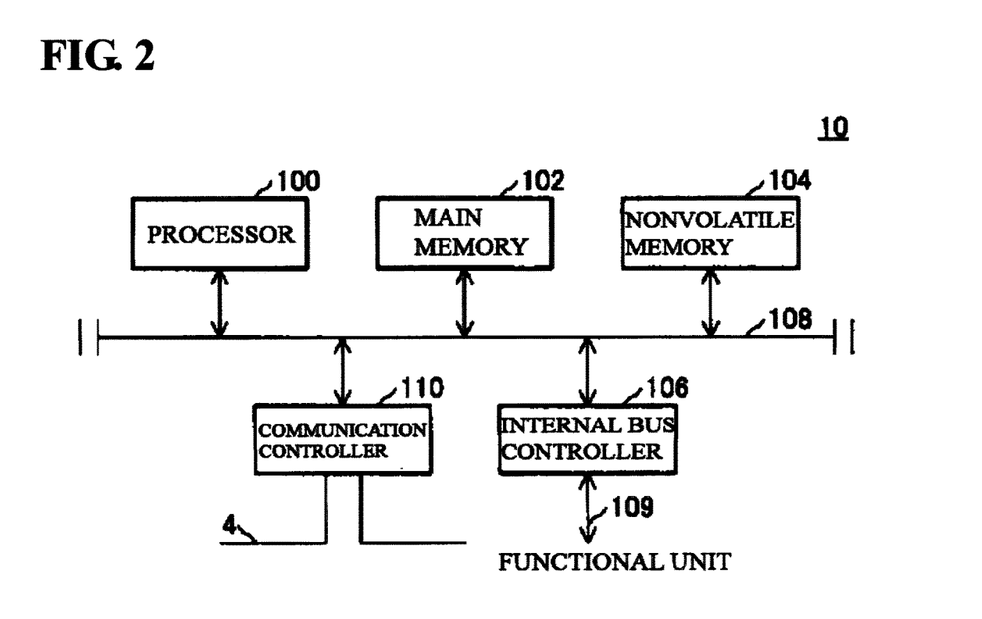
FIG. 2 is a schematic diagram illustrating the device configuration of a CPU unit that is included in a PLC system according to one or more embodiments.

Next, the device configuration of the CPU unit 10 that is included in the PLC system 1 according to one or more embodiments will be described. FIG. 2 is a schematic diagram showing the device configuration of the CPU unit 10 that is included in the PLC system 1 according to one or more embodiments.

Referring to FIG. 2, the CPU unit 10 includes a processor 100 which is a computational part, a main memory 102, a nonvolatile memory 104, and an internal bus controller 106, in addition to the communication controller 110 which is a communication processing part. These components are configured to be able to perform data communication with each other, via the internal bus 108.

The processor 100 executes programs relating to control. The processor 100 reads out required programs from the nonvolatile memory 104 and the like, and loads and executes the read programs in the main memory 102. Programs relating to control, typically, include user programs and system programs.

The internal bus controller 106 is connected to the functional units 20 via an internal bus 109, and mediates the exchange of data (IN data and OUT data) between the processor 100 and the functional units 20.

The communication controller 110 is connected to the slave devices 40 via the field network 4, and mediates the exchange of data (IN data and OUT data) between the CPU unit 10 and the slave devices 40.

The communication controller 110 may realize part or all of the functions of the communication controller 110 including the abovementioned function of mediating the exchange of data between the CPU unit 10 and the slave devices 40 using software. Alternatively, part or all of the functions of the communication controller 110 may be realized using a hardware circuit such as an ASIC (Application-Specific Integrated Circuit) or an FPGA (Field-Programmable Gate Array).

C. Device Configuration of Slave Devices 40

Figure 3:
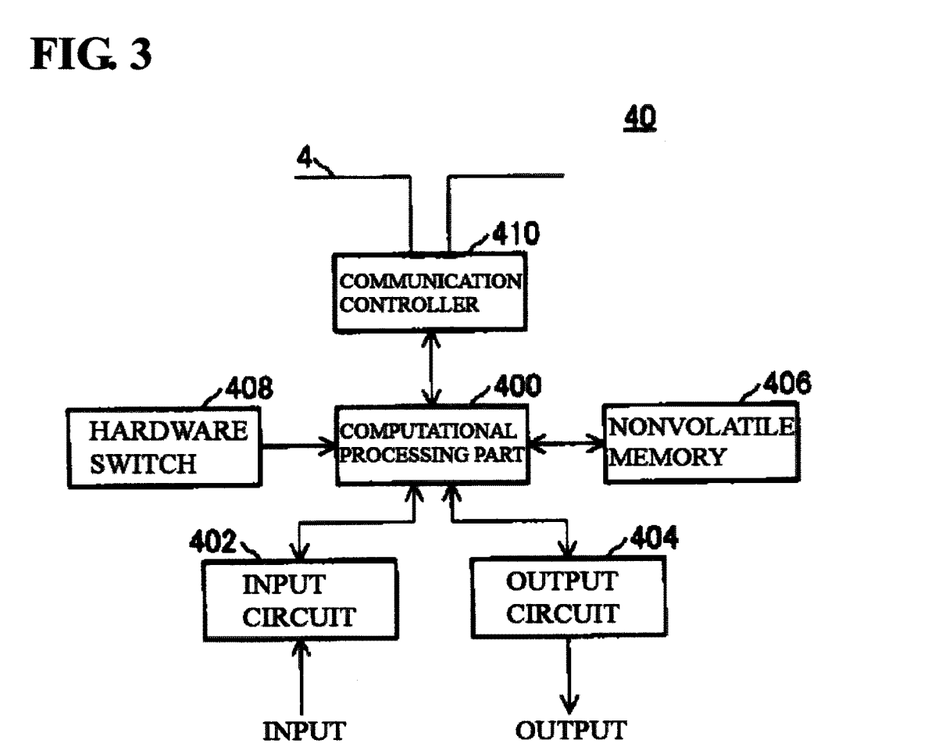
FIG. 3 is a schematic diagram illustrating an example of the device configuration of a slave device that is included in a PLC system according to one or more embodiments.

Next, the device configuration of the slave devices 40 that are included in the PLC system 1 according to one or more embodiments will be described. FIG. 3 is a schematic diagram showing an example of the device configuration of the slave devices 40 that are included in the PLC system 1 according to one or more embodiments.

While various configurations can be employed as the slave devices 40 according to one or more embodiments, an exemplary configuration having a computational function and an IO function is shown in FIG. 3. Referring to FIG. 3, the slave devices 40 include a computational processing part 400, an input circuit 402, an output circuit 404, and a communication controller 410.

The computational processing part 400 executes predetermined processing, based on data transmitted via the field network 4, and sends data that is obtained as a result of processing via the field network 4.

The input circuit 402 outputs information showing signals input from the field side to the computational processing part 400. An output circuit outputs a signal that depends on OUT data provided from the computational processing part 400 to the field side.

The communication controller 410 is connected to the CPU unit 10 via the field network 4, and mediates the exchange of data (IN data and OUT data) between the slave devices 40 and the CPU unit 10.

The nonvolatile memory 406 is connected to the computational processing part 400, and stores information such as unique information of the slave devices 40. The unique information stored in the nonvolatile memory 406 is, for example, a node address, a serial number, a type name, a product name or the like of the slave devices 40. Note that the nonvolatile memory 406 may be configured to be connected to the communication controller 410. Also, the nonvolatile memory 406 may be configured to be embedded in the computational processing part 400 or the communication controller 410.

The hardware switch 408 is constituted by a DIP switch or a rotary switch, and is connected to the computational processing part 400, for example. The value that is shown with the hardware switch 408 is set as a node address which is one type of unique information of the slave devices 40. The node address of the slave devices 40 is set so as to be indicated by the node address stored in the nonvolatile memory 406, in the case where the node address is not shown by the hardware switch 408. Note that the hardware switch 408 may be configured to be connected to the communication controller 410.

With regard to the computational processing part 400, the input circuit 402, the output circuit 404, and the communication controller 410 of the slave devices 40, all or part of the functions thereof may be realized using software, although it is preferable to realize part or all of the functions thereof, using a hardware circuit such as an ASIC or an FPGA.

D. Field Network

Next, communication processing in the field network 4 will be described.

As the communication method in the field network 4, a method that enables data communication in a predetermined communication period (i.e., that enables real-time communication) is preferable. As an example, various types of industrial Ethernet (registered trademark) can be used as the field network 4. As specific examples of industrial Ethernet (registered trademark), there is EtherCAT (registered trademark), PROFINET IRT, MECHATROLINK (registered trademark)-III, Powerlink, SERCOS (registered trademark)-III, CIP Motion, and the like, for example. In the following description, an exemplary configuration using EtherCAT (registered trademark) will be described, as a typical example.

Communication frames are transmitted cyclically over the field network 4. In other words, communication frames sent from the master device 2 will be sequentially transferred to the slave devices 40A to 40G. All communication frames transferred through the slave devices 40 are returned to the master device 2. In other words, communication frames are transmitted cyclically through the master device 2 and the slave devices 40A to 40G.

More specifically, communication frames include a header, a data area allocated to each slave device 40, and a footer. The address and various attribute information of the communication frame are stored in the header. OUT data and IN data about the corresponding slave devices 40 are stored in the individual data areas. Information for detecting and correcting errors in the contents of the communication frame is stored in the footer.

Also, apart from OUT data and IN data, message data between the master device 2 and the slave devices 40 may be stored in the data area of the communication frames.

The master device 2 generates and sends a communication frame by writing OUT data that is provided for each slave device 40 to the data area allocated to the target slave device 40. Each slave device 40, upon receiving the communication frame from upstream, extracts OUT data addressed thereto from the data area allocated thereto, out of the received communication frame, and writes IN data collected thereby to the data area allocated thereto to regenerate the communication frame and sends the regenerated communication frame downstream. OUT data and IN data are thus sequentially updated as a result of communication frames being transmitted cyclically.

In other words, in the field network 4 according to one or more embodiments, communication frames (instruction values) storing OUT data addressed to all of the slave devices 40 is sent from the master device, and, in each slave device 40, communication frames in which OUT data (instruction values) and IN data (feedback values) have been replaced are returned to the master device 2. In other words, the exchange of data between the master device 2 and the slave devices 40 is completed, as a result of communication frames being transmitted round.

E. Address Setting Processing

Next, processing for setting a node address for a slave device 40 when adding the slave device 40 to the above-mentioned PLC system 1 will be described. The node address assigned to each slave device 40 is used in message communication or setting for carrying out the exchange of IN data and OUT data such as mentioned above. The node addresses thus need to be appropriately set in each slave device 40.

Various settings of the PLC system 1 are executed by a support device which is a general-purpose PC (personal computer) in which management software for managing the PLC system 1 is incorporated. For example, a network configuration showing the topology of the field network 4 (connection mode of the slave devices 40) is created in the support device. The created network configuration is downloaded to the master device side by connecting the support device to the master device 2, and is stored in the nonvolatile memory 104 of the master device 2.

Figure 4:
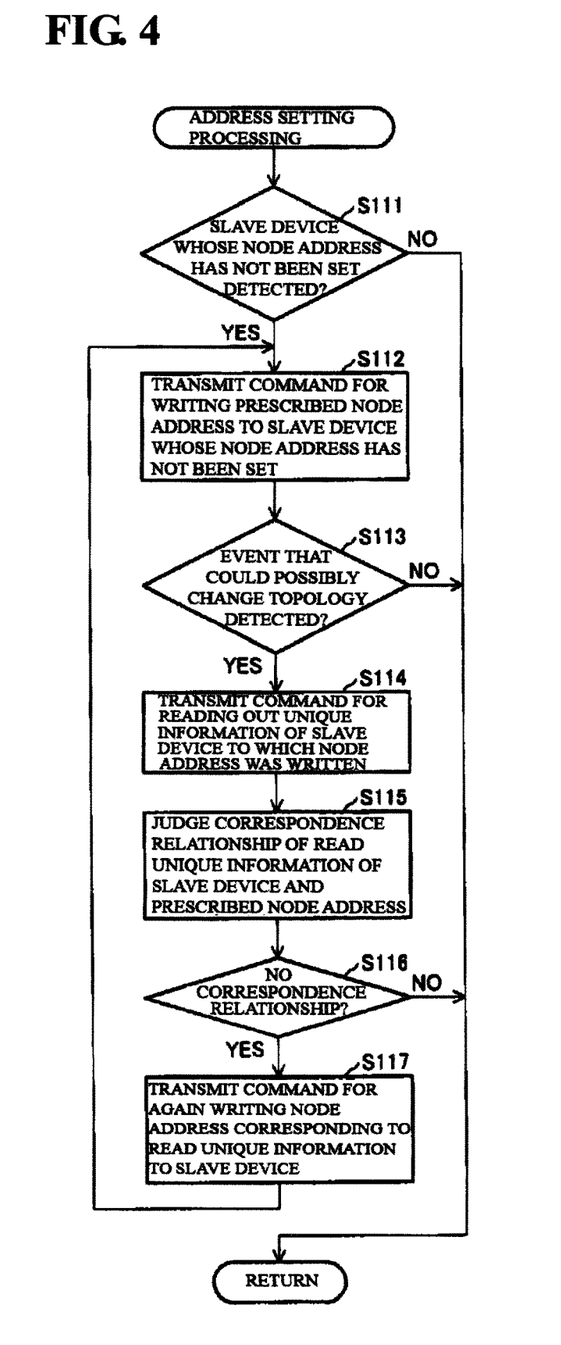
FIG. 4 is a flowchart illustrating the flow of address setting processing according to one or more embodiments.

FIG. 4 is a flowchart showing the flow of address setting processing according to one or more embodiments. This address setting processing is called by other programs, and is executed by the processor 100 of the CPU unit 10 of the master device 2.

Referring to FIG. 4, the processor 100 judges whether a slave device 40 that is included in the network configuration stored in the nonvolatile memory 104 but whose node address has not actually been set has been detected (step S111). If it is judged that such a slave device 40 has not been detected (NO in step S111), the processor 100 ends this address setting processing and returns the processing to be executed to the program that is the call source.

If it is judged that a slave device 40 whose address has not been set has been detected (YES in step S111), the processor 100 transmits a command (hereinafter, the communication frame for giving an instruction will be called a command) for writing a prescribed node address to the slave device 40 (step S112).

At this time, since the node address of the slave device 40 has not been set, the processor 100 specifies the position information of the slave device 40, based on the topology shown with the network configuration, and transmits, in the aforementioned communication frame, a command for the slave device of the specified position information. This position information is, for example, an auto increment address which is the order in which communication frames are to be circulated. This auto increment address is automatically determined in accordance with a predetermined rule when network topology is defined. For example, in the case of FIG. 1, the auto increment addresses of the slave device 40A, the slave device 40B, the slave device 40C, the slave device 40D, the slave device 40E, the slave device 40F and the slave device 40G are respectively determined as "1" to "7".

Next, the processor 100 judges whether an event that could possibly change the topology has been detected (step S113). This event is the disconnection/connection of a communication cable of the field network 4 in any of the slave devices 40. The PLC system 1 is configured such that the processor 100 can detect the disconnection/connection of the communication cable.

Note the event that could possibly change the topology is not limited thereto, and may be a change in the number of slave devices 40 that are included in the topology. The PLC system 1 is configured such that the processor 100 is capable of detecting a change of the number of slave devices 40.

If it is judged that an event that could possibly change the topology has not been detected (NO in step S113), the processor 100 ends this address setting processing and returns the processing to be executed to the program that is the call source. In this way, if there is no possibility of a change in topology, setting of a node address is ended with only an extremely small number of steps being executed.

On the other hand, if it is judged that an event that could possibly change the topology has been detected (YES in step S113), the processor 100 transmits a command for reading out the unique information of the slave device 40 to the slave device having the same position information as the position information of the slave devices 40 to which the node address was written in step S112 (step S114). The unique information that is read out is, for example, the node address that was stored before writing the node address to the nonvolatile memory 406 of the slave device 40, the node address that is set with the hardware switch 408 of the slave devices 40, the serial number, type name or product name of the slave device 40, or the like. The unique information is stored in association with the position information, in the network configuration that is stored in the nonvolatile memory 104 of the master device 2. Note that, here, it is assumed that the node address of a slave device 40 that is stored in the nonvolatile memory 104 of the master device 4 will be the same as the node address that is set with the hardware switch 408 of the slave device 40, but the present invention is not limited thereto, and both node addresses need only be associated with each other.

The processor 100 then compares the read unique information of the slave device 40 with the unique information of the slave device 40 having a prescribed node address in the network configuration that is stored in the nonvolatile memory 104, and judges whether there is a correspondence relationship, and, if the unique information differs, judges that there is not a correspondence relationship (step S116).

If it is judged that there is a correspondence relationship (NO in step S116), the processor 100 ends this address setting processing and returns the processing to be executed to the program that is the call source.

On the other hand, if it is judged that there is not a correspondence relationship (YES in step S116), the processor 100 transmits a command for again writing the node address that is in the network configuration stored in the nonvolatile memory 104 (the original node address of the slave device 40) in correspondence with the read unique information to the slave device (step S117). Thereafter, the processor 100 returns the processing to be executed to step S112.

For example, in the case where the slave device 40E of FIG. 1 has been newly added, a command for writing the node address "7" is transmitted to the slave device having the auto increment address "5" in step S112, in the case of setting "7" as the node address in the slave device 40E.

When, for example, the communication cable of the slave device 40D that is on the upstream side of the new slave device 40E is disconnected immediately therebefore (immediately before step S112), the slave device having the auto increment address "5" will be the slave device 40F, and the node address "7" is written to this slave device 40F.

In such a case, disconnection of the cable is detected as an event that could possibly change the topology in step S113. The node address "5" that was stored before the node address is written is read out as unique information from the slave device 40F in step S114. In step S115, the correspondence relationship between the read node address "5" serving as unique information and the written node address "7" is judged. As a result, it is judged that there is not a correspondence relationship, and, in step S117, "5" which is the node address corresponding to the read unique information is again written to the slave device 40F.

In step S112, a command for writing the node address "7" is then transmitted to the slave device having the auto increment address "5", and, this time, an event that could possibly change the topology is not detected, and the node address "7" is written to the correct slave device 40E.

F. Variations (1) In the aforementioned embodiments, the master device 2 adopted the configuration shown in FIG. 1. However, the present invention is not limited thereto, and may be an industrial PC provided with a hardware board having the functions of the master device 2, or may be an industrial PC incorporating software having the functions of the master device 2.

(2) In the aforementioned embodiments, a configuration was adopted in which the communication controller 110 is provided in the CPU unit 10 of the master device 2, as shown in FIG. 2, and the address setting processing shown in FIG. 4 is performed by the CPU unit 10 of the master device 2. However, the present invention is not limited thereto, and a configuration may be adopted in which the communication controller 110 is provided in one of the functional units 20, and the address setting processing shown in FIG. 4 is executed by that functional unit 20.

(3) In the aforementioned embodiments, a configuration was adopted in which the communication method of the field network 4 is an industrial Ethernet (registered trademark). However, the present invention is not limited thereto, and an IP (Internet Protocol) network or other communication method may be employed. In this case, the aforementioned node address corresponds to an IP address, and the aforementioned unique information corresponds to a MAC (Media Access Control) address.

(4) In the aforementioned embodiments, one or more embodiments are described as a master device which is one example of a communication device. However, the present invention is not limited thereto, and the aforementioned embodiments can be seen as one or more embodiments serving as the PLC system 1, which is one example of a communication system. Also, the aforementioned embodiments can be seen as one or more embodiments of a communication program.

G. Advantages (1) As described above, the master device 2 is, as shown in FIG. 1, communicably connected to a plurality of slave devices 40 via a communication cable. As shown in step S112 of FIG. 4, the master device 2 sets a prescribed node address in an added slave device based on the position information of the added slave device in a topology that is composed of a plurality of slave devices 40.

As shown in step S113 of FIG. 4, the master device 2 judges whether a change has possibly occurred in the topology, when a prescribed node address is set in the added slave device. As shown from step S114 to step S115 of FIG. 4, the master device 2, if there is an erroneously set slave device whose node address was erroneously set, specifies the erroneously set slave device, when it is judged that a change has possibly occurred. As shown in step S117 of FIG. 4, the master device 2 resets the node address of the specified erroneously set slave device to the original node address.

When a node address has possibly been erroneously set, the node address of the erroneously set slave device is thereby again set to the original node address, and a prescribed node address is thereafter set in the added slave device. In this way, the node addresses of the slave devices 40 can be efficiently configured to a correct state.

(2) The master device 2 is provided with a nonvolatile memory 104 in which a network configuration showing the positions of the plurality of slave devices 40 that are included in the topology is stored in advance. As shown in step S112 of FIG. 4, the master device 2 specifies the position information of the added slave device based on the network configuration stored in the nonvolatile memory 104. As shown in step S112 of FIG. 4, the master device 2 transmits a command for setting a prescribed node address to the slave device 40 having the specified position information.

Node addresses can thereby be set based on position information with respect to slave devices 40 whose node address has not been set.

(3) As shown in step S114 of FIG. 4, the master device 2 acquires unique information from a slave device whose node address has been set. As shown in step S115 of FIG. 4, the master device 2 judges whether the node address corresponding to the acquired unique information differs from the prescribed node address. The master device 2, in the case where the corresponding node address is judged to be different, specifies the set slave device as an erroneously set slave device.

Slave devices whose node address was erroneously set can thereby be reliably specified.

(4) As shown in step S113 of FIG. 4, the master device 2 judges whether a change has possibly occurred in the topology by detecting that the communication cable has been disconnected/connected in a slave device 40. The possibility that a change has occurred in the topology can thereby be accurately judged.

(5) As shown in step S113 of FIG. 4, the master device 2 judges whether a change has possibly occurred in the topology by detecting whether there is a change in the number of the slave devices 40. The possibility that a change has occurred in the topology can thereby be accurately judged.

(6) Also, even in cases where there is an unexpected cable misconnection, or temporary interruption of the cable occurs due to noise, or there is an unintentional change in topology, or miswiring of the communication cable of the field network 4, automatic restoration is possible before control of the slave devices 40 is affected, and control by the master device 2 can be continued. As a result, the robustness and environmental resistance of the PLC system 1 can be improved, and high operation efficiency (does not stop operating) of the PLC system 1 can be realized.

The embodiments disclosed herein are considered in all respects to be illustrative and not restrictive. The scope of the invention is indicated by the claims rather than by the foregoing description, and all changes that come within the meaning and range of equivalency of the claims are intended to be embraced therein.

The invention claimed is:

1. A communication system comprising a communication device functioning as a master device and a plurality of slave devices communicably connected to the communication device via a communication line, the communication device comprising a processor configured with a program to perform operations comprising:

operation as a setting unit that sets an address in an added slave device from an original address to a prescribed address based on a position of the added slave device in a topology that is composed of a plurality of the slave devices;

operation as a judging unit that judges whether a change has occurred in the topology in response to the prescribed address being set in the added slave device by the setting unit;

operation as a specifying unit that, in response to an erroneously set slave device having an address that was erroneously set by the setting unit, specifies the erroneously set slave device, in response to the judging unit judging that the change has occurred in the topology; and operation as a resetting unit that resets the address set in the erroneously set slave device specified by the specifying unit to an original address of the erroneously set slave device.

2. A communication device functioning as a master device that is communicably connected to a plurality of slave devices via a communication line, comprising:

a processor configured with a program to perform operations comprising:

operation as a setting unit that sets an address in an added slave device from an original address to a prescribed address based on a position of the added slave device in a topology comprising a plurality of the slave devices;

operation as a judging unit that judges whether a change has occurred in the topology in response to the prescribed address being set in the added slave device by the setting unit;

operation as a specifying unit that, in response to an erroneously set slave device having an address that was erroneously set by the setting unit, specifies the erroneously set slave device, in response to the judging unit judging that the change has occurred in the topology; and operation as a resetting unit that resets the address set in the erroneously set slave device specified by the specifying unit to an original address of the erroneously set slave device.

3. The communication device according to claim 2, wherein the processor is configured with the program to perform operations such that operation as the setting unit further comprises:

operation as a setting storage unit that stores in advance setting information indicating positions of the plurality of slave devices that are included in the topology;

operation as a position specifying unit that specifies the position of the added slave device based on the setting information stored in the setting storage unit; and operation as a transmitting unit that transmits a command for setting the prescribed address to the added slave device that is at the position specified by the position specifying unit.

4. The communication device according to claim 2, wherein the processor is configured with the program to perform operations such that operation as the specifying unit further comprises:

operation as an acquiring unit that acquires unique information from the added slave device whose address was set by the setting unit; and operation as a unique information judging unit that judges whether the unique information acquired by the acquiring unit differs from unique information corresponding to the prescribed address, and in response to judging by the unique information judging unit that the acquired unique information differs, operation as the specifying unit comprises operation as the specifying unit that specifies the added slave device whose address was set by the setting unit as the erroneously set slave device.

5. The communication device according to claim 2, wherein the processor is configured with the program to perform operations such that operation as the judging unit comprises operation as the judging unit that judges whether the change has occurred in the topology by detecting that the communication line has been disconnected or connected in a slave device of the plurality of slave devices.

6. The communication device according to claim 2, wherein the processor is configured with the program to perform operations such that operation as the judging unit comprises operation as the judging unit that judges whether the change has occurred in the topology by detecting whether a number of slave devices comprising the plurality of slave devices has changed.

7. A non-transitory computer-readable storage medium storing a communication program that is executed in a communication device functioning as a master device that is communicably connected to a plurality of slave devices via a communication line, the communication program causing a processor of the communication device to perform operations comprising:

setting an address in an added slave device from an original address to a prescribed address based on a position of the added slave device in a topology that is composed of a plurality of the slave devices;

judging whether a change has occurred in the topology in response to the prescribed address being set in the added slave device;

in response to an erroneously set slave device having an address that was erroneously set, specifying the erroneously set slave device, in response to judging that the change has occurred in the topology; and resetting the address set in the specified erroneously set slave device to an original address of the erroneously set slave device.

* * * * *